United States Patent
Loi

(10) Patent No.: US 10,607,187 B2
(45) Date of Patent: Mar. 31, 2020

(54) HETEROGENEOUS DATA MANAGEMENT METHODOLOGY AND SYSTEM

(71) Applicant: TraxID, LLC, Dallas, TX (US)

(72) Inventor: Duke Loi, Frisco, TX (US)

(73) Assignee: TRAXID, LLC, Dallas, TX (US)

( * ) Notice: Subject to any disclaimer, the term of this patent is extended or adjusted under 35 U.S.C. 154(b) by 221 days.

(21) Appl. No.: 15/666,550

(22) Filed: Aug. 1, 2017

(65) Prior Publication Data
US 2017/0330152 A1 Nov. 16, 2017

Related U.S. Application Data

(63) Continuation-in-part of application No. 14/206,455, filed on Mar. 12, 2014, now abandoned.

(60) Provisional application No. 61/791,046, filed on Mar. 15, 2013, provisional application No. 62/403,599, filed on Oct. 3, 2016.

(51) Int. Cl.
*G06F 17/30* (2006.01)
*G06Q 10/10* (2012.01)
*G06Q 10/06* (2012.01)
*G06Q 30/06* (2012.01)
*G06Q 30/04* (2012.01)
*G06F 16/25* (2019.01)
*G06F 16/22* (2019.01)

(52) U.S. Cl.
CPC ......... *G06Q 10/103* (2013.01); *G06F 16/256* (2019.01); *G06Q 10/063114* (2013.01); *G06Q 30/04* (2013.01); *G06Q 30/0633* (2013.01); *G06F 16/2282* (2019.01)

(58) Field of Classification Search
CPC .......... G06Q 10/103; G06Q 10/063114; G06F 16/256
USPC ................................................. 707/600–899
See application file for complete search history.

(56) References Cited

U.S. PATENT DOCUMENTS

2016/0217423 A1* 7/2016 Magnan ............... G06Q 10/103

* cited by examiner

*Primary Examiner* — Isaac M Woo
(74) *Attorney, Agent, or Firm* — Wei Wei Jeang; Grable Martin Fulton PLLC

(57) ABSTRACT

A system for storing, interpreting, displaying, and processing heterogeneous data comprises a common data layer configured to manage and store abstracted data using a standard relational database, the common data layer comprises a template repository storing a plurality of data-logic templates and user data. The system further includes a data abstraction layer comprising rules for processing user data and handling a user-interface, an intelligence layer comprises context sensitive processing logic of user inputs and data from the data abstraction layer according to the data-logic templates, and a user interface layer configured to present the processed data and capture user inputs for the system.

23 Claims, 5 Drawing Sheets

| ASSET TYPE | FIELD 1 | FIELD 2 | FIELD 3 | | FIELD N |
|---|---|---|---|---|---|
| TYPE 1 | [TYPE 1].[DATA 1] | [TYPE 1].[DATA 2] | [TYPE 1].[DATA 3] | | [TYPE 1].[DATA N] |
| TYPE 2 | [TYPE 2].[DATA 1] | [TYPE 2].[DATA 2] | [TYPE 2].[DATA 3] | ... | [TYPE 2].[DATA N] |
| TYPE 3 | [TYPE 3].[DATA 1] | [TYPE 3].[DATA 2] | [TYPE 3].[DATA 3] | | [TYPE 3].[DATA N] |
| TYPE 2 | [TYPE 2].[DATA 1] | [TYPE 2].[DATA 2] | [TYPE 2].[DATA 3] | | [TYPE 2].[DATA N] |
| TYPE 1 | [TYPE 1].[DATA 1] | [TYPE 1].[DATA 2] | [TYPE 1].[DATA 3] | | [TYPE 1].[DATA N] |

FIG. 3

| wo_detail_id | template_id | wo_id | field1 | field2 | field3 | field4 | field5 | field6 | field7 | ... | field23 | field24 | field25 | ext_id |
|---|---|---|---|---|---|---|---|---|---|---|---|---|---|---|
| 1167 | 21 | 125 | 491 | | 7/9/2014 | 8573 | A309 | 7/8/2014 | C7-182 | ... | 1444 | Spotcheck | 6807 | NULL |
| 1168 | 22 | 125 | Pass \| Pass | C/R | | Used | C/R | Used | Pass | ... | NULL | NULL | NULL | 1167 |
| 1169 | 23 | 125 | | | | | | Box Outside Diameter / Inner Diameter | 5-5/8 / N/A / 8 / N/A | ... | 6-1/16 / 7-1/2 | Lead / Taper | N/A / N/A / N/A / N/A | 1168 |
| 1170 | 24 | 125 | | | | | | | | ... | | | | 1169 |
| 1171 | 25 | 125 | N/A | Stabilizer | Box \| ACC | ---- \| ---- | ACC | | | ... | | | | 1170 |
| 1172 | 26 | 125 | N/A | Scab / Stick Bearing Housing | Pin/Pin / N/A | Box \| N/A | | N/A | Compression Ring | ... | Pin / Pin / ACC / ACC | Box \| ACC | ACC | 1171 |
| 1173 | 27 | 125 | N/A | Boot Ring | Pin \| ACC | ---- \| ---- | | N/A | Tie Rod | ... | Box / ACC | Box \| ACC | ---- | 1172 |
| 1174 | 28 | 125 | N/A | Stator Adapter Housing | Pin \| ACC | Box \| ACC | ---- | N/A | Spline | ... | Pin \| ACC | Box \| ACC | ---- | 1173 |
| 1175 | 29 | 125 | MT/UT/VT | | | Flex Drill Adjustable Inspection | CORP100004-001 | N/A | Top Sub - Rig-Conn: 6-5/8 REG | ... | Box / ACC | Box \| ACC | ---- | 1174 |
| 17431 | 56 | 1344 | 123 Drilling Company | John Doe | 281 555 2934 | Hard Banding | 59334 | Hardband | Hard banding service | ... | NULL | NULL | NULL | NULL |

FIG. 4

| General | Assets | Notes | Attachment | 1 - 4 | 5 - 9 | 10 - 14 | 15 - 19 |
| 20 - 24 | 25 - 29 | 30, Dimensions | Shearwave, Borescope | Equipment |

Coil
S/N    0491
Size
Calibration    7/9/2014

AC Yoke
S/N    8573
10 LB Block S/N    A309
Calibration Date    7/8/2014

Gauss Meter
S/N    07-182
Calibration Date    10/26/2013
...    ...

Penetrant
Brand    Spotcheck
Batch No.    01444

Developer
Brand    Spotcheck
Batch No.    6807

FIG. 5

| General | Assets | Notes | Attachment | 1 - 4 | 5 - 9 | 10 - 14 | 15 - 19 |
| 20 - 24 | 25 - 29 | 30, Dimensions | Shearwave, Borescope | Equipment |

Inspection Method    MT/UT/VT
Motor Type
Summary

Report
Title    Flex Drill Adjustable Inspection
Layout No.    CORP100004-001

Item 1
Serial Number    N/A
Description    Top Sub – Rig-Conn: 6-5/8 REG
Connection 1 | Result 1    Box | ACC
Connection 2 | Result 2    Pin | ACC
FB Result

Item 2
Serial Number    N/A
Description    Rotor Catch
Connection 1 | Result 1    Pin | ACC
Connection 2 | Result 2
FB Result

Item 3
Serial Number    S7E27730
Description    Stator
Connection 1 | Result 1    Box | ACC
Connection 2 | Result 2    Box | ACC
FB Result

FIG. 6

| General | Assets | Notes | Attachment | Activity | Details |

| Customer | 123 Drilling Company |
| Contact Name | John Doe |
| Contact Number | 281-555-2934 |
| Type of Service | Hard Banding |
| P.O. Number | 59384 |
| Work Applied | Hardband ▼ |
| Service Note | Hard banding service |

FIG. 7

| wo_id | wo_number | loc_id | wo_type_id | work_order_description | wo_detail_id | wo_status | created_by | created_date_time | ... |
|---|---|---|---|---|---|---|---|---|---|
| 125 | ABC-130730094635 | 3 | 3 | Flex Drill Adjustable Inspection | 1175 | 120 | 2 | 8/2/2013 12:20:53 AM | ... |
| 1844 | XYZ-1406355449 | 32 | 12 | Servicing work order for demo | 17481 | 10 | 1 | 3/4/2014 3:24:09 PM | ... |

FIG. 8

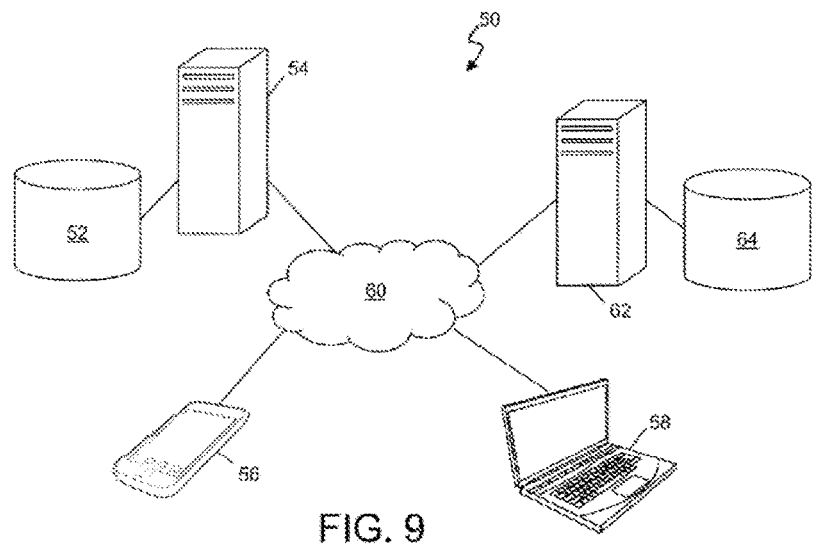

FIG. 9

HETEROGENEOUS DATA MANAGEMENT METHODOLOGY AND SYSTEM

RELATED APPLICATION

This application is a Continuation-in-Part Applications of U.S. application Ser. No. 14/206,455 filed on Mar. 12, 2014 entitled "Heterogeneous Data Management Methodology and System", which claims the benefit of U.S. Provisional Application No. 61/791,046 filed on Mar. 15, 2013. This application also claims the benefit of U.S. Provisional Application No. 62/403,599 filed on Oct. 3, 2016. All of the disclosures in these applications are incorporated herein by reference.

FIELD

The present disclosure primarily relates to a heterogeneous data management methodology and system.

BACKGROUND

In traditional software design, datasets are created specifically for predefined data fields and types. In order to manage heterogeneous data in a system, either multiple datasets are created for different data types, or a large dataset is used to encompass all possible data fields of every possible data types. These approaches are inefficient and inflexible to change.

DESCRIPTION OF THE DRAWINGS

FIG. 3 is a block diagram illustrating an exemplary format for the data record or data table of the heterogeneous data management methodology and system according to the teachings of the present disclosure;

FIG. 4 is a diagram illustrating an exemplary detail data section record or table of the heterogeneous data management methodology and system according to the teachings of the present disclosure;

FIGS. 5-7 are screen captures of exemplary data displays according to the to the teachings of the present disclosure;

FIG. 8 is a diagram illustrating an exemplary general data section record or table of the heterogeneous data management methodology and system according to the teachings of the present disclosure;

FIG. 9 is a simplified block diagram of an exemplary environment in which the heterogeneous data management methodology and system are adapted to operate.

DETAILED DESCRIPTION

A new and unconventional system and method of managing heterogeneous data is described in this disclosure. This heterogeneous data management methodology enables a software system to manage and store heterogeneous data homogeneously in a single system and data structure. For example, different work order types with different data sizes can be stored in the same common data layer. Storage utilization is maximized by only storing data fields that are relevant to the assets or work orders. Adding new assets (e.g., oil well, motor, pipe) or work order types (e.g., service motor, inspect pipe, install motor, etc.) does not require a complete makeover of the database tables, but instead, the addition can be handled dynamically and incrementally without taking the entire system offline. Thus, this methodology provides great expandability and adaptability to system implementation. Furthermore, the intelligent data management layer provides additional data abstraction and protection.

Figure 1:
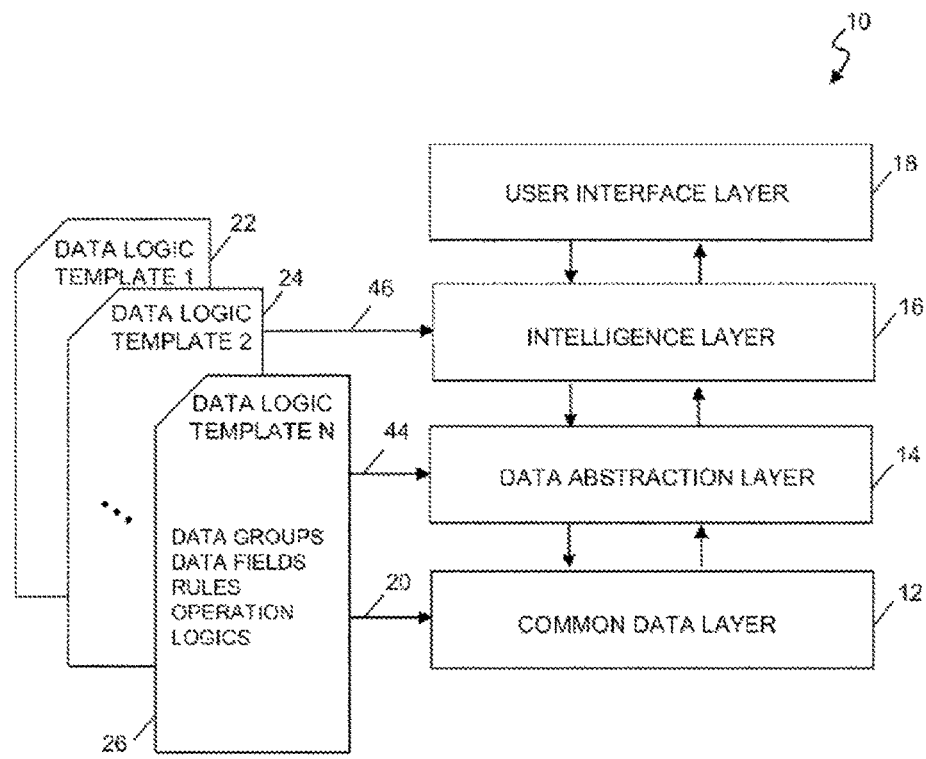
FIG. 1 is a block diagram illustrating the architecture of the heterogeneous data management methodology and system according to the teachings of the present disclosure.

This software methodology 10 for managing heterogeneous asset and work-order data includes four functional layers: common data layer 12, data abstraction layer 14, intelligence layer 16, and user interface layer 18. These layers 12-18 are primarily driven by data-logic templates 20-24 which are defined for each asset and/or work order type, as shown in FIG. 1.

Each data-logic template 20-24 defines the data groups, data fields, business rules, and operation logics for an asset category or work order type. Thus, one system uniformly manages multiple categories of assets and work order types, and enables cross-template updates according to their predefined rules and operation logics. Adding a new asset category or work order type to an existing system is possible by adding a new template. In short, a data-logic template defines how the system should handle an asset category or work order type, and how the data of one template interacts with other templates.

Therefore, data are validated and processed according to a data-logic template of a specific data object type, data are also abstracted according to a data-logic template of a specific data object type, and data are extracted based on extracting rules that are defined in a data-logic template of a specific data object type.

The first layer is the common data layer 12 which manages and stores abstracted data using standard relational database system. It includes a template repository and user data. The template repository stores all data-logic templates 20-24 of the system 10. The system 10 uses these data-logic templates 20-24 to create screens, tabs, and data fields at the user interface layer 18, and to process the data at the intelligence layer 16. The user data is structured and stored according to the database schemas 20 of the data abstraction layer 14 and the data-logic templates 22-26.

Figure 2:
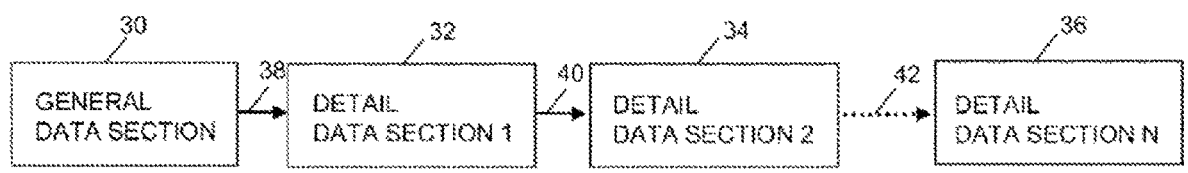
FIG. 2 is a block diagram illustrating an exemplary dynamically mapped dataset of the heterogeneous data management methodology and system according to the teachings of the present disclosure.

User data of different data object types are encoded and stored in the same set of common database tables. Each data record is stored in a dynamically mapped dataset which contain a general data section 30 and one or more linked detail data sections 32-36, as shown in FIG. 2. Detail data sections 32-36 are linked to the general data section 30 and to one another by the detail section pointers 38-42. The general purpose of the General Data Section 30 is to provide the system a consistent way to process and search all work orders regardless of their work order types. Thus, data fields within the General Data Section 30 are consistently named and defined. The general data section 30 contains key data fields that are used by the system to identify, locate, and interpret subsequence detail datasets. The detail data sections contain data-logic defined datasets that can only be interpreted by data-logic template definitions.

FIG. 3 is an exemplary drawing of a detail data section which illustrates the same database column can store different data from different data object types with different data types and attributes. For example, a drill pipe data object type and a mud motor data object type can store different data in the same database column of the same database table.

The layer above the common data layer 12 is the data abstraction layer 14. It provides rules to the layers 16 and 18 above for processing user data and handling the user-interface. In addition, it encodes and decodes user data to and from the common data layer 12 according to the data definitions 44. The data abstraction layer 14 places a field name and rules to a detail field and allows the layers above to correctly process the data. The data abstraction layer 14 allows different types of data stored in the same database column for different asset or work order types, as shown in FIG. 3. Thus, this data storing method maximizes the database table utilization and enables new addition of asset categories and work order types without adding database tables and the programming changes to the existing system.

The intelligence layer 16 provides context-sensitive logic and processing of user input and data from the data abstraction layer 14 according to the data-logic templates 22-26. The data processing includes, but not limited to, data validation, data updates/postings, calculations, screen controlling, and report generation. The intelligence layer 16 retrieves data and screen processing rules 46 dynamically from the corresponding template 24 on demand.

The last layer of the model is the user interface layer 18 which presents the processed data and captures user inputs for the system. The screen and field layouts are controlled by the intelligence layer 16 based on the data-logic template definition 46 of an active asset category or work order type. A system can have different screen layouts and data fields for different asset categories and/or work order types. This simplifies and unclutters the screens, and only presents necessary information to the user.

Different work order types with different data sizes can be stored in the same common data layer 12. FIG. 4 is an exemplary work order detail 32-36 that contains data records from two different work order types: tool inspection and tool servicing. This tool inspection work order type example has many data fields, which occupies 9 rows of record and each record contains 25 data fields and system controlling fields. By looking at the rows of data in the common data layer 12, field1 from one row has no corresponding meaning to field1 in another row. For example, field1 of first row contains a serial number of an inspection coil, and field1 of second row contains inspection results of an asset. Further, field1 of the last row contains a customer name of a service work order.

The data abstraction layer 14 interprets or manages each data field according to the predefined definition of the templates 26. Thus, the system controls where to save the data, how to display them, and what business logics should be applied to them. Without the data abstraction layer 14 and the corresponding templates 26, the system would not know how to manage the data, and all data become meaningless to the system and the users. Above the data abstraction layer 14, the intelligence layer 16 applies data processing logics and formatting rules 24 to the data when they are entered by the user or retrieved from the system. The intelligence layer 16 performs according to the corresponding template and instructs the user interface layer 18 on how to display the data and their field labels.

As shown in FIGS. 5-7, the data from the previous example are displayed differently according to the templates. The data from field1 of the first row in FIG. 4 is shown as serial number under the "Coil" section with the field label of "S/N." The data from field1 of row 9 (second to last row) in FIG. 4 is shown and interpreted as a method of inspection in FIG. 6, and displayed with the field label of "Inspection Method." These fields are displayed as read-only fields due to the definitions of Tool Inspection work order template. However, data from field1 of last row in FIG. 4 is shown as customer name in FIG. 7 with the field label of "Customer." This field is read/write field to permit the user to enter or edit the data as it is defined in Service work order template.

FIG. 4 illustrates a Detail Data Section as shown in FIG. 2. The Detail Data Sections 32-36 can be one or many as defined in each template. Thus, the General Data Section 30 allows the system to find the Detail Data Sections 32-36 by linking them, as shown in FIG. 2 and FIG. 8 below. FIG. 8 illustrates the General Data Section 30 with a common system data field for work orders and the Detail Data Section link in work order detail ID field (wo_detail_id). In the first row of the data record shown in FIG. 8, the work order detail ID has a value of 1175 (not shown in the table) which links to row 9 (second to the last row) of FIG. 4. The extension field (next to last field) in row 9 links to 1174 which is the row right above it. The links continue until reaching the first row of FIG. 4 which has a value of NULL, that is the end of the Detail Data Section for that particular work order with Tool Inspection work order type. FIGS. 5-7 show various detail data tabs on the screen (after the Activity tab). They are shown because of the Intelligence Layer and the Tool Inspection work order template. The Intelligence Layer relays the template definition to the User Interface Layer which draws the corresponding tabs, field labels, field, titles, and their formats.

The general purpose of the General Data Section 30 is to provide the system a consistent way to process and search all work orders regardless of their work order types. Thus, data fields within the General Data Section 30 are consistently named and defined; i.e. second field of row 1 has the same data type as row 2, where both are work order numbers, for example.

FIG. 9 is a simplified block diagram of an exemplary environment 50 in which the heterogeneous data management methodology and system are adapted to operate. The database 52 in which user data and data-logic templates are stored may be accessed by a server 54, which is further accessible by users using various types of computing devices 56 and 58, which may be, for example, mobile telephones, tablet computers, GOOGLE glasses, laptops, desktop computers, and other forms of computing devices now known and later developed. The communication medium 60 may be wired and wireless, and implement any number of known and future communication protocols. The communication medium 60 may be part of a local area network, wide area network, the Internet, and other computer networks. The database 52 and server 54 may be mirrored in one or more servers 62 and databases 64.

The present disclosure relates to a heterogeneous data management system that comprises data-logic templates which defines: how different data types are stored and managed in common database tables for different assets or work orders; data sets that include field names, data types, data attributes, and rules for each types of assets or work orders; and data interaction between work order data and asset data.

The present disclosure relates to creating new screens and data fields by importing a data-logic template file without programming or database changes.

The present disclosure relates to different data fields that are stored in common database tables that are shared by different object types (i.e. assets or work orders) at the common data layer.

The present disclosure relates to data abstraction layer that applies data field names, data types, data attributes, and rules to the raw data in common data layer based on predefined data-logic template of a specific asset or work order type. The present disclosure relates to an intelligence layer that manages how data fields interact with each other based on the data-logic templates. The present disclosure relates to a user interface layer that presents each data field according to data-logic template definition and how the system validates the user input.

Figure 10:
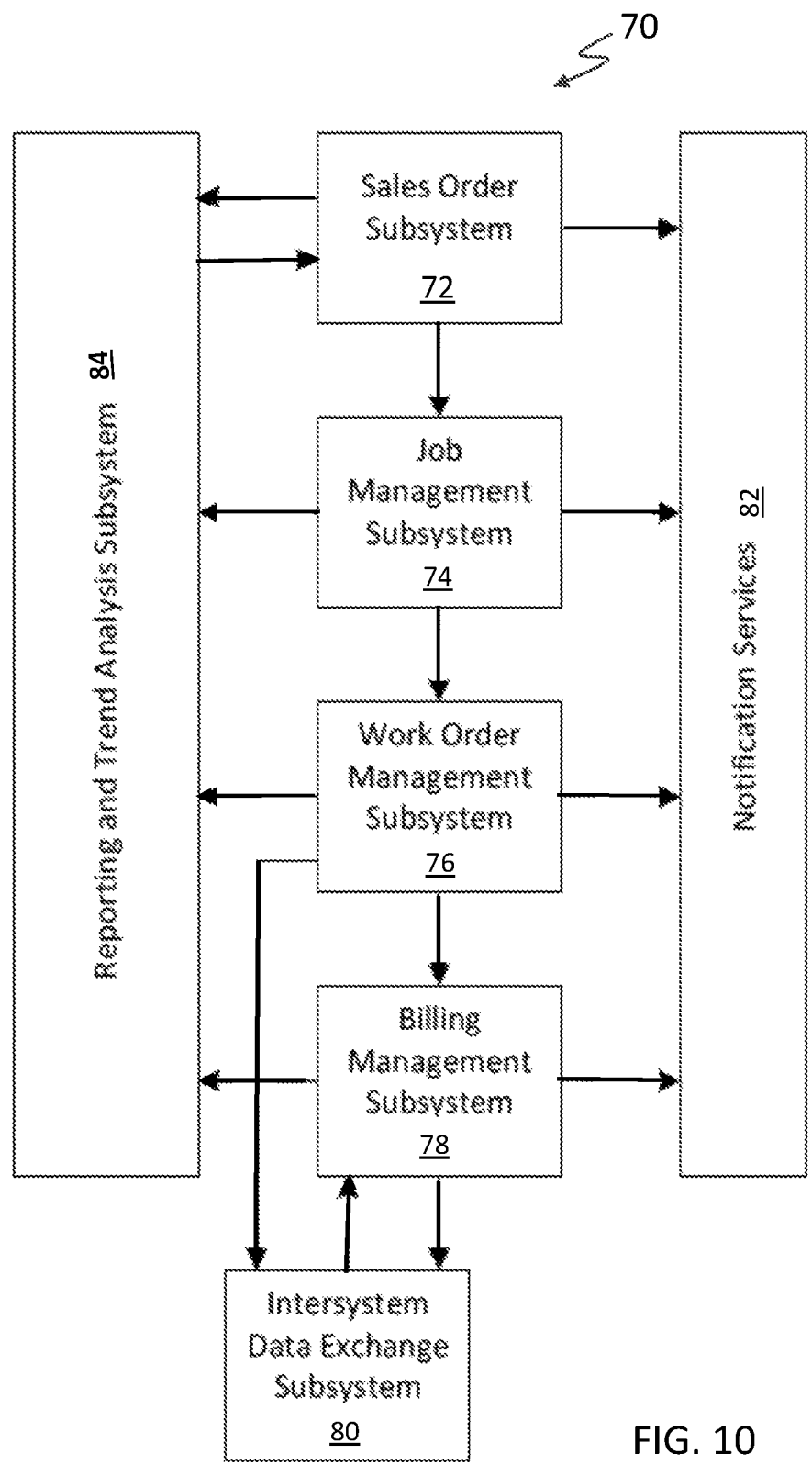
FIG. 10 is a simplified block diagram of an exemplary oilfield inspection system having a plurality of logic modules built on the heterogeneous data management system according to the teachings of the present disclosure.

FIG. 10 is a simplified block diagram of an exemplary oilfield inspection system 70 having a plurality of logic modules/subsystems 72-84 built on the heterogeneous data management system according to the teachings of the present disclosure. These logic modules/subsystems 72-84 are designed and built on the heterogeneous data management software architecture described herein, which enables different types of data to be stored in a database and shared between the logic modules or subsystems. Predefined functional and data templates allow data between subsystems to be managed effectively by referencing the templates without extensive code changes. The adaptability of the database connects these logic modules seamlessly and improves their functional adaptability.

FIG. 10 describes the interrelationship of the logic modules also referred herein as subsystems of an oilfield inspection system 70. Sales Order subsystem 72 provides a consolidated decision-making web portal or app on tablets or laptop computing devices for sales personnel working in the field to make quick decisions and generate bids or quotations for inspection jobs. The relationship of sales orders, jobs, and work orders enable the reporting and trend analysis subsystem 84 to analyze the works from sales orders or bids to jobs and then to the actual works within the same system. The heterogeneous data management system 10 allows the system to store and analyze data from different phases of work processes with different types of works and assets. Sales orders can be created in Sales Order subsystem 72 and converted into a job upon approval of the sales order in Job Management subsystem 74. Both the sales order and the job can include multiple work items with different inspection types and asset types which are used to create inspection work orders in Work Order Management subsystem 76. By assigning a data-logic template to job items within a job, it enables Job Management subsystem 74 to create work orders with different asset types and inspection work order types within the same job. When creating work orders, the system uses the data-logic templates 22, 24, 26 to create the work orders with the correct data fields, validation logic, screens, and business rules for each inspection types. This allows a job to manage multiple work orders where each work order is linked to the originating job in the Job Management subsystem 74 and also back to a sales order in the Sales Order subsystem 72.

When work orders are approved by a user, tickets and/or invoices can be automatically generated in the Billing Management Subsystem 78. Data-logic templates 22, 24, 26 provide business rules to Billing Management subsystem 78 on how to automatically post work orders into tickets or invoices. Some work order types post each work order as a single entry into field a ticket or invoice; whereas other work order types post individual work items within a work order as separate entries to a field ticket or invoice. For example, a drilling motor inspection work order posts the entire work order, which has multiple components, to a field ticket or invoice as a single invoice entry, but a bottom-hole assembly inspection work order posts each work items within a work order as separate items to an invoice. Furthermore, billing management subsystem 78 uses different rules to calculate the prices for different work order types. The pricing rules for inspecting a drilling mud motor is entirely different than the pricing rules of inspection a multitude of drill pipe. It includes the main prices, as well as, calculating the supplementary prices per item and per types of inspection method uses. This is possible because of the data-logic templates for each work order types and the intelligence layer 16, even though all work order data are stored in same sets of data tables within the common data layer 12.

The process also allows field managers and billing personnel to obtain all necessary approvals from customers. Some field inspection jobs require approval stamps at the inspection site and others require proper purchase order and job numbers from customers after reviewing work order reports and tickets. The Notification Services Subsystem 82 automatically notifies billing personnel and operation managers whenever invoices are approved or rejected by customers. It allows rejected invoices to be handled immediately and shorten the delay for receivables. Once invoices are approved by a user, they are posted in batches into a backend accounting system via the Intersystem Data Exchange Subsystem 80. All related reports, tickets, invoices, inspection data, pictures, attachments are also sent to interested recipients via emails.

Inspection results from different inspection methods and asset types are stored in the same sets of database tables within the common data layer 12. The reporting and trend analysis subsystem 84 can perform data mining and data analysis of the relevant data across different asset types and inspection work order types according to the data-logic template 22, 24, 26. Hence, damages such as cracks, damaged shoulder, damaged thread, eccentric wear, bent, etc. can be analyzed in drill pipe inspection, drill collar inspection, drilling mud motor inspection, and so on. Even though damages may occur on different asset types and discovered via different inspections, but reporting and trend analysis subsystem 84 is able to draw conclusion and/or projection for drilling operator practices, oilfield formation characteristics, equipment reliability based on similar damages observed. Heterogeneous data management system 10 allows software solutions to collectively capture, understand, and analyze similar data without changing the analysis models or data mapping to other data tables or databases.

Work Order Management subsystem 76 is capable of automatically handling different types of inspections of different types of assets. Hence, the same software system can document inspection of drill pipes based on, for example, American Petroleum Institute (API) inspection methods and standards, and can also document inspections of drilling mud motor based on, for example, Standard DS-1 specifications. Different sets of measurements are required to be captured and following different processes to determine if the inspected items passes or fails the inspection. The API drill pipe inspection measurements include wall thickness, outside diameter, shoulder width, and tong space; whereas DS-1 drilling mud motor inspection measurements include bevel diameter, bore-back, thread and seal conditions for every component within a drilling mud motor. Furthermore, a drill pipe inspection work order contains hundreds of drill pipes that are being inspected individually within the same work order/job, but a drilling mud motor inspection work order only contains one main item with many components that make up the drilling mud motor and are also being inspected. Via the heterogeneous data abstraction layer 14, Work Order Management subsystem 76 is able to store and interpret different data on the same set of data tables in the common data layer 12. The Work Order Management subsystem 76 can handle a completely new work order type (i.e. pipeline inspection) by importing a new data-logic template 22, 24, 26 for that work order type without adding new database tables or modifying existing tables to handle the new data. In addition, Work Order Management subsystem 76 can be extended to support proprietary data, workflows, and grouping of work processes into the same work order type, i.e., grouping drill pipe inspection with workforce management by clocking in/out of inspectors in the field and uploading hours and issues to payroll system and issue management system.

Captured inspection results and measurements are validated in Work Order Management subsystem 76 based on the inspection rules and standards defined in the intelligence layer 16. Work Order Management subsystem 76 also displays warnings and calculations to inspectors via the user interface layer 18 according to each data-logic template 22, 24, 26 for various types of inspections. For example, wall thickness measurement of a drill pipe is essential to pass a drill pipe inspection of each drill pipe; however, it is not required for inspecting a drill collar. By selecting inspection work order types, the software system internally decides which data-logic template 22, 24, 26 to use for validating the required data fields and/or calculations. This provides flexibility to changing validation rules and customizing inspection types.

The Reporting and Trend Analysis subsystem 84 captures and analyzes historical bids and jobs that are similar to the current job being bid on and feeds the data into the Sales Order subsystem 72 in order to recommend bids to the sales personnel, as well as provide data on potential risk factors. Once a bid is generated, Sales Order subsystem 72 automatically tracks the bidding progress and updates the user throughout the lifecycle of that bid. It automatically sends notification messages or emails via the Notification Services subsystem 82 to the corresponding personnel, as well as generating tracking reports for upper management. All bids are also tracked and rated by the Notification Services dashboards. The Notification Services 82 has a suite of services that automatically process and manage notifications sent to users, managers, vendors, customers, and subsystems depending on the context of the messages and the originating subsystem. More importantly, it has a web-based dashboard for managers and executives to have consolidated access to high-level information for quick business and operation decisions. Once customers accept the bids, the Job Management Subsystem 74 tracks them as pending jobs and provides operation metrics for operation managers. Operation managers will have in-depth visibility of each job and tools to schedule and approve jobs for work by personnel. Approved jobs generates work orders in the Work Order Management Subsystem 76 and operation managers can assign them to inspectors or inspection lines. Work orders are automatically tracked throughout the subsystem, which sends notifications to related personnel throughout the entire work process to report work status. Work status includes:

Work assignments—notify inspectors about the pending works and their schedules and work instructions and travel information for field jobs.

Work reassignments—whenever work orders are reassigned to other inspectors or inspection lines.

Work completions—whenever work orders are completed and ready to generate tickets.

Work approvals or rejections—notify related individuals to promptly address rejected work orders, and allowing billing personnel to create invoices for approved work orders.

Non-work incidents—notify operation managers about non-work incidents in the field that may affect work schedules and resources, such as bad weather, equipment issues, safety concerns, personnel absences, logistics issues, etc.

Sending inspection reports, field tickets, and invoices for all completed work orders are governed by sets of business rules within the intelligence layer 16 according to the data-logic templates 22, 24, 26 for different types of work orders and process state of the work orders. For example, upon completing and approving of a work order, Notification Services 82 may immediately collect all needed data by the external system via the data abstraction layer 14 and the corresponding data-logic template 22, 24, 26 for that work order type. With the confirmation from intelligence layer 16 based on the business rules from the data-logic template 22, 24, 26, the notification services 82 groups and sends emails with report attachments to certain recipients. In addition, pushing inspection results to other external systems includes intricate tasks of getting the correct data at the correct state of the work orders. External systems may include other ERP systems, inventory management systems, and financial systems. Each external system requires different set of data and the method of delivery. For example, a financial system only be interested of invoice data and the inspection reports of the work order; whereas an inventory management system is interested to receive inspection results per asset serial numbers and the frequency of inspections. Some external system requires the data to be pushed to the system and other may be interest to obtain exported files.

Intersystem Data Exchange Subsystem 80 supports many data integration roles beside posting invoices. It is able to download financial information from backend systems to accurately measure works and revenue progresses and projections. It can also push inspection results to customers' databases via the Internet.

Reporting and Trend Analysis Subsystem 84 collects and measures jobs, revenues, inspections, user activities, and device data throughout the subsystems. It provides the ability to perform data mining to generate in-depth data analysis and trends from data that may not appear to be related at first glance. Inspection analysis may include: (1) inspected damages, (2) inspection frequencies, (3) reliability and life-expectancy, (4) additional services rendered during inspection, (5) component deterioration over time. Operations analysis may include: (6) operation efficiency, (7) market penetrability, (8) product-line return-on-investment.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A system for storing, interpreting, processing, and displaying heterogeneous data related to sales orders, bids, jobs, work orders, and assets stored in a database, comprising:

a computer processor configured to access data stored in the database, including data associated with past jobs, historic bids for jobs, jobs in progress, pending jobs, and further comprising processing logic including:
- a common data layer configured to manage and store abstracted data in the database, the common data layer comprises a template repository configured for storing user data and a plurality of data-logic templates defining data types, data attributes, and rules for each data type, and rules for data interaction between different data types;
- a plurality of rules of a data abstraction layer configured for processing user data stored in the database and handling a user-interface configured for display on a display screen, the data abstraction layer interprets each data field according to the data-logic templates;
- an intelligence layer having context sensitive processing logic configured to process user inputs and user data stored in the database according to the data-logic templates and the plurality of rules of the data abstraction layer;
- a user interface layer configured to create screens, tabs, and data fields to present the processed data and capture user inputs for the system according to the data-logic templates;
- a job management module configured to access the data in the database and create work orders for a job according to the data-logic templates and keep track of status of jobs in progress;
- a work order management module configured to access the database and keep track of work orders associated with jobs in progress, including work assignments, work reassignments, work approvals, work rejections, and work completions; and
- a trend analysis module configured to access the database and analyze data associated with completed jobs and historic bids for jobs.

2. The system of claim 1 further comprising a sales order subsystem configured to access the database and create a sales order and converting the sales order to a job in response to approval of the sales order, wherein the job includes a plurality of work items and asset types.

3. The system of claim 1 further comprising a billing module configured to access the database and automatically generate invoices for completed work assignments.

4. The system of claim 3 further comprising a notification module configured to automatically notify and request customer approval of generated invoices.

5. The system of claim 1 wherein the data-logic templates are configured to define how different data types are stored and managed in common database tables for different assets and work orders associated with jobs.

6. The system of claim 1 wherein the data-logic templates are configured to define data sets including field names, data types, data attributes, and rules for each data type.

7. The system of claim 1 further comprising different data fields stored in common database tables that are shared by different object types at the common data layer.

8. The system of claim 1 wherein the data abstraction layer is configured to apply data field names, data types, data attributes, and rules to the raw data in common data layer based on predefined data-logic template of a specific asset or work order type.

9. The system of claim 1 wherein the user interface layer is configured to present each data field according to data-logic template definition and how the system validates the user input.

10. The system of claim 1 wherein the common data layer comprises:
- a general data section containing key data fields used to identify, locate and interpret detail data sections; and
- at least one detail data section containing data-logic defined datasets that can be interpreted by data-logic template definitions.

11. The system of claim 8 wherein the common data layer further comprises data pointers linking the general data section and the at least one detail data section.

12. An oilfield inspection system, comprising:
- a computer processor configured to access data stored in the database, including data associated with past inspection jobs, historic bids for inspection jobs, inspection jobs in progress, and pending inspection jobs associated with oilfield equipment, and further comprising processing logic including:
  - a sales order subsystem configured to provide a web-portal interface to access the database and create a sales order and automatically converting the sales order to an inspection job in response to approval of the sales order, wherein the inspection job includes a plurality of work items and asset types
  - a job module configured to access the data in the database and create work orders for inspection jobs according to a plurality of data-logic templates stored in a template repository defining data types, data attributes, and a plurality of rules for process and interpret each data type, and rules for data interaction between different data types, and keep track of status of jobs in progress;
  - a work order module configured to access the database and keep track of work orders associated with inspection jobs in progress, including work assignments, work reassignments, work approvals, work rejections, and work completions;
  - a billing module configured to access the database and automatically generate invoices for completed work assignments according to the data-logic templates and the plurality of rules;
  - a trend analysis module configured to access the database and analyze data associated with completed jobs and historic bids for jobs; and
  - a notification module configured to automatically generate and transmit notifications to users according to the data-logic templates.

13. The system of claim 12, wherein the data-logic templates are configured to define how different data types are stored in common database tables for different assets categories and work order types.

14. The system of claim 12, further comprising different data fields stored in common database tables that are shared by different object types at a common data layer.

15. The system of claim 12, further comprising a data abstraction layer configured to apply data field names, data types, data attributes, and rules to the raw data in common data layer based on predefined data-logic template of a specific asset or work order type.

16. The system of claim 12, further comprising a user interface layer configured to present each data field according to data-logic template definition.

17. The system of claim 12, further comprising a user interface layer configured to validate user input according to the data-logic template definition.

18. The system of claim 12, wherein the common data layer comprises:

a general data section containing key data fields used to identify, locate and interpret detail data sections; and at least one detail data section containing data-logic defined datasets that can be interpreted by data-logic template definitions.

19. The system of claim 16 wherein the common data layer further comprises data pointers linking the general data section and the at least one detail data section.

20. A method of storing, interpreting, displaying, and processing heterogeneous data related to assets and work orders associated with inspection jobs stored in a database comprising:

providing data-logic templates which defines how data types are stored and interpreted in common database tables for different assets and work orders, data sets that include field names, data types, data attributes, and rules for each types of assets or work orders, and rules for data interaction between work order data and asset data;

storing data associated with jobs at different stages of progress according to the data-logic template definitions in the database;

interpreting data stored in the database according to the data-logic template definitions;

processing data stored in the database according to the data-logic template definitions;

displaying data stored in the data fields of the database according to the data-logic template definitions;

receiving and validating user input according to the data-logic template definitions; and accessing the database and analyze data associated with completed inspection jobs and historic bids for inspection jobs.

21. The method of claim 20, wherein storing data comprises storing data in a common data layer including a general data section containing key data fields used to identify, locate and interpret detail data sections, and at least one detail data section containing data-logic defined datasets that can be interpreted by data-logic template definitions.

22. The method of claim 20, further comprising encoding and decoding data stored in a common data layer according to the data-logic template definitions.

23. A method for storing, interpreting, displaying, and processing heterogeneous data associated with a plurality of jobs at various stages of progress comprising:

providing a plurality of data-logic templates defining data types, data attributes, and rules for interaction between different data types;

receiving and validating user inputs according to the plurality of data-logic templates;

storing data associated with the plurality of jobs at various stages of progress in data fields in common database tables defined by the plurality of data-logic templates, the plurality of jobs comprising oil and gas equipment inspection jobs;

interpreting the stored data associated with the plurality of inspection jobs according to the plurality of data-logic templates;

context sensitive processing of user inputs and data according to the plurality of data-logic templates;

creating and displaying screens, tabs, and data fields to present data according to the data-logic templates;

accessing the stored data and keeping track of the status of the plurality of inspection jobs in progress;

accessing the stored data and keeping track of work orders associated with the plurality of inspection jobs in progress, including work assignments, work reassignments, work approvals, work rejections, and work completions; and accessing the stored data and analyzing the stored data associated with completed inspection jobs.

\* \* \* \* \*